United States Patent
Mori et al.

(10) Patent No.: US 7,328,767 B2
(45) Date of Patent: Feb. 12, 2008

(54) POWER TRAIN SUPPORTING APPARATUS AND METHOD FOR AUTOMOTIVE VEHICLE

(75) Inventors: Kenshi Mori, Kanagawa (JP); Hitoshi Murakami, Kawasaki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 315 days.

(21) Appl. No.: 11/080,837

(22) Filed: Mar. 16, 2005

(65) Prior Publication Data
US 2005/0211492 A1 Sep. 29, 2005

(30) Foreign Application Priority Data
Mar. 24, 2004 (JP) ............................. 2004-087061

(51) Int. Cl.
*B62M 7/02* (2006.01)

(52) U.S. Cl. .................. 180/291; 180/228; 180/232; 180/54.1; 180/283; 180/284; 180/342; 180/364; 180/271; 180/41; 180/172; 180/274; 180/281; 180/290

(58) Field of Classification Search ............. 180/291, 180/297, 352, 377, 382
See application file for complete search history.

(56) References Cited

U.S. PATENT DOCUMENTS

| | | | | |
|---|---|---|---|---|
| 1,103,524 A * | 7/1914 | Marmon | ..................... | 180/291 |
| 2,346,123 A * | 4/1944 | Willson | ..................... | 280/104 |
| 4,408,794 A * | 10/1983 | Harasaki | ..................... | 296/198 |
| 4,930,743 A * | 6/1990 | Ishimaru et al. | ............. | 248/638 |
| 5,024,482 A * | 6/1991 | Isukimi et al. | ......... | 296/203.02 |
| 5,035,296 A * | 7/1991 | Sjostrand | ..................... | 180/297 |
| 5,267,630 A * | 12/1993 | Watanabe et al. | ........... | 180/297 |
| 6,155,372 A * | 12/2000 | Hirasaka | ..................... | 180/297 |
| 7,240,755 B2 * | 7/2007 | Iwata et al. | .................. | 180/219 |

FOREIGN PATENT DOCUMENTS

JP 09-123770 A 5/1997

* cited by examiner

*Primary Examiner*—Christopher P. Ellis
*Assistant Examiner*—Cynthia F. Collado
(74) *Attorney, Agent, or Firm*—Foley & Lardber LLP

(57) ABSTRACT

In a power train supporting apparatus and method for an automotive vehicle, at least three mount portions support a power train constituted by an engine and a transmission on a frame of a vehicle body in such a manner that the output axle of the engine intersects a center line of a vehicular longitudinal direction as viewed from a top of the vehicle. The three mount portions comprise engine front and rear side mounts arranged on a vehicular front side and a vehicular rear side with respect to the engine and a transmission side mount arranged in the vicinity of the transmission. The mounts are arranged in such a manner that a distance from a weight center of the power train to each of the engine front and rear side mounts is shorter than a distance from the weight center of the power train to the transmission side mount.

12 Claims, 6 Drawing Sheets

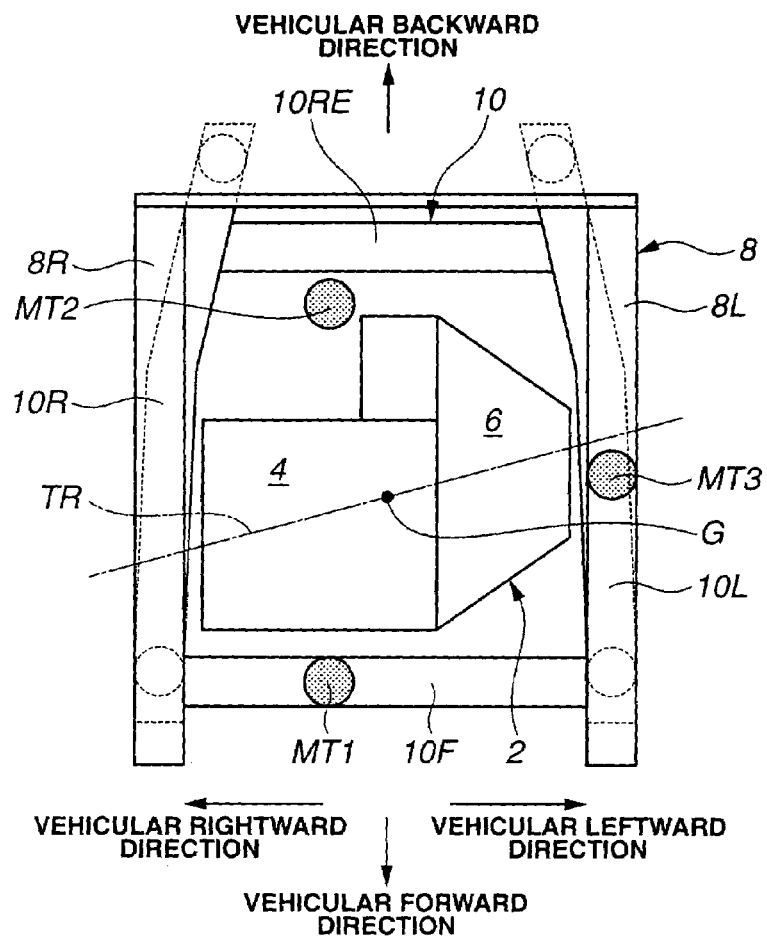
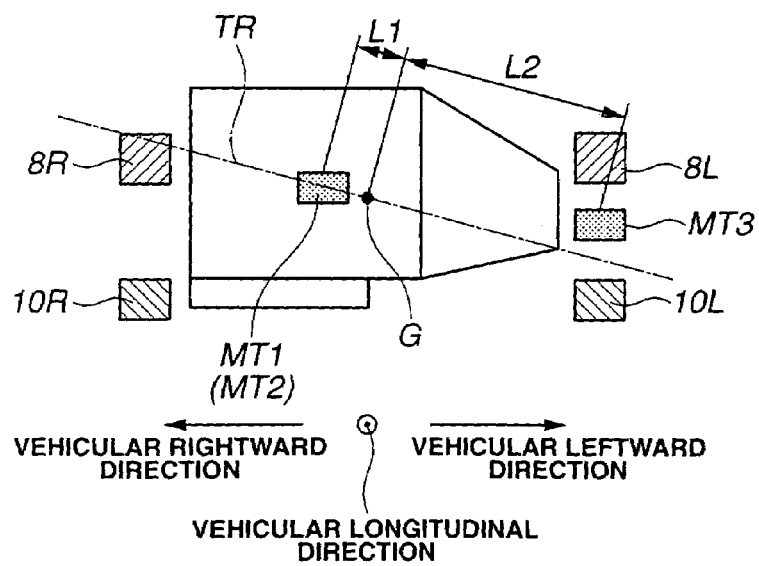

POWER TRAIN SUPPORTING APPARATUS AND METHOD FOR AUTOMOTIVE VEHICLE

BACKGROUND OF THE INVENTION

1. Field of the Invention

The present invention relates to a power train supporting apparatus and a method for an automotive vehicle and, particularly, relates to the power train supporting and method for supporting a power train arranged in a lateral direction with respect to a vehicular longitudinal direction (in this specification, the vehicular longitudinal direction means a vehicular forward-and-backward direction).

2. Description of the Related Art

A Japanese Patent Application First Publication No. Heisei 9-123770 published on May 13, 1997 exemplifies a previously proposed power train supporting apparatus in which, in a case where a power train constituted by an engine and a transmission is mounted in a lateral direction with respect to a vehicular forward-and-backward direction, a plane including a principal axis of inertia passing through a weight center of the power train and a vertical line is formed, mount portions are arranged in the vicinity of this plane and at least three mount portions are arranged on upper and lower positions of an outer end of the engine and the principal axis of inertia and an upper portion of an outer end of the transmission and the principal axis of inertia.

SUMMARY OF THE INVENTION

However, since, in the previously proposed power train supporting apparatus disclosed in the above-described Japanese Patent Application First Publication, the power train is supported at the proximities of the engine outer end and principal axis of inertia and the transmission outer end and the principal axis of inertia, it is difficult for a natural (vibration) frequency in a pitch direction of the power train to be lowered into a relatively low frequency region and it is difficult for a floor vibration during an engine idling excited due to the vibration of the pitch direction of the power train according to a vibration excitation (force) of a rotational inertia of the engine in a case where the power train having the engine in which the vibration in the pitch direction is relatively large is mounted in a lateral direction with respect to the vehicular forward-and-backward direction.

It is, hence, an object of the present invention to provide power train supporting apparatus and method which are capable of reducing the floor vibration by easily reducing the natural frequency of the power train in the pitch direction to the low frequency region than the vibration frequency at which the floor vibration during the engine idling is generated to be made difficult in exciting the floor vibration. It is noted that a definition of the pitch direction of the power train is shown in FIG. 9.

According to one aspect of the present invention, there is provided a power train supporting apparatus for an automotive vehicle, comprising: a power train including an engine and a transmission arranged in series with an output axle of the engine; and at least three mount portions that support the power train on a frame of a vehicle body in such a manner that the output axle of the engine is intersected to a center line of a vehicular longitudinal direction as viewed from a top of the vehicle, the three mount portions comprising engine front and rear side mounts arranged on a vehicular front side and a vehicular rear side with respect to the engine and a transmission side mount arranged in the vicinity to the transmission and being arranged in such a manner that a distance from a weight center of the power train to each of the engine front and rear side mounts is shorter than a distance from the weight center of the power train to the transmission side mount.

According to another aspect of the present invention, there is provided a power train supporting method for an automotive vehicle, the automotive vehicle having a power train including an engine and a transmission arranged in series with an output axle of the engine, the method comprising: providing at least three mount portions that support the power train on a frame of a vehicle body in such a manner that the output axle of the engine is intersected to a center line of a vehicular longitudinal direction as viewed from a top of the vehicle, the three mount portions comprising engine front and rear side mounts arranged on a vehicular front side and a vehicular rear side with respect to the engine and a transmission side mount arranged in the vicinity to the transmission; and arranging the three mount portions on the vehicle body in such a manner that a distance from a weight center of the power train to each of the engine front and rear side mounts is shorter than a distance from the weight center of the power train to the transmission side mount.

This summary of the invention does not necessarily describe all necessary features so that the present invention may also be sub-combination of these described features.

BRIEF DESCRIPTION OF THE DRAWINGS

FIG. 7 is a schematic top view of the power train supporting apparatus in the third preferred embodiment according to the present invention.

FIG. 8 is a schematic front view of the power train supporting apparatus in the third preferred embodiment.

DETAILED DESCRIPTION OF THE PREFERRED EMBODIMENTS

Reference will hereinafter be made to the drawings in order to facilitate a better understanding of the present invention.

Figure 1:
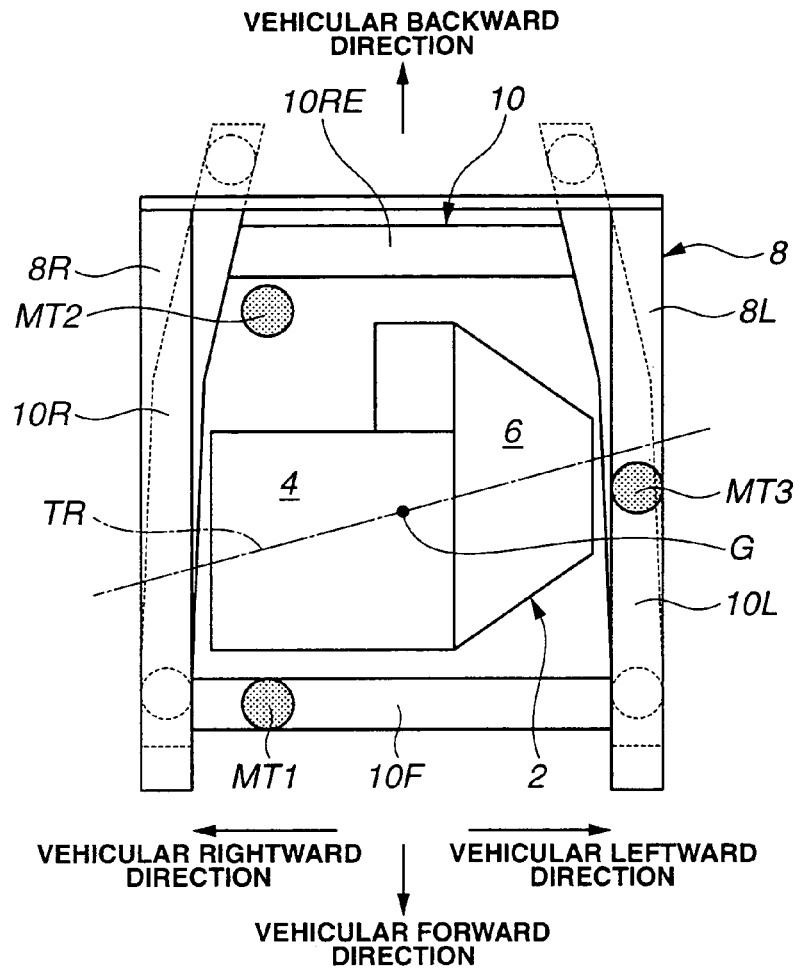
FIG. 1 is a schematic top view of a power train supporting apparatus for an automotive vehicle in a first preferred embodiment according to the present invention.
Figure 2:
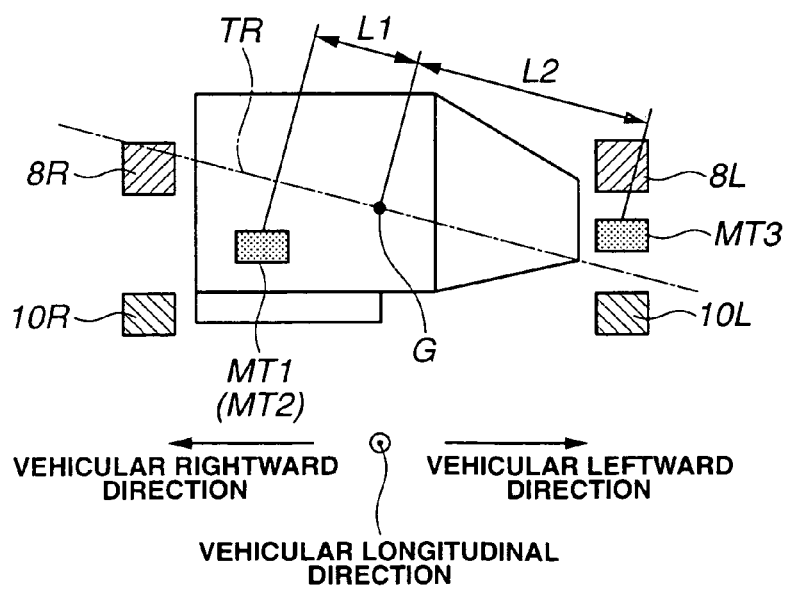
FIG. 2 is a schematic front view of the power train supporting apparatus for the automotive vehicle in the first preferred embodiment according to the present invention.

FIG. 1 shows a schematic top view of a power train supporting apparatus in a first preferred embodiment according to the present invention. FIG. 2 shows a schematic (elevation) front view of the power train supporting apparatus shown in FIG. 1. In FIGS. 1 and 2, a reference symbol G denotes a weight center of a power train 2, an engine 4 and a transmission 6 being integrally mounted into power train 2. This power train 2 is arranged in a lateral direction with respect to a vehicular forward-and-backward direction (which, in this specification, has the same meaning as a vehicular longitudinal direction).

This power train 2 is supported on a frame located at a front side of the vehicle. This frame is constituted by a main frame 8 supporting an automotive vehicle body and a sub frame 10 disposed on a lower position of main frame 8 and is coupled to main frame 8. Main frame 8 includes: a pair of left and right main side members 8R and 8L extended in the vehicular forward-and-backward direction; a front cross member (not shown) which links both front end portions of main side members 8L, 8R and extended in a vehicular width direction (vehicular leftward-and-rightward direction); and a rear cross member (not shown) which links both of rear end portions of main side members 8L, 8R and extended in the vehicular width direction. Sub frame 10 includes: a pair of left and right sub side members 10L, 10R located at a lower position of main side members 8L, 8R and extended in the vehicular forward-and-backward direction; a sub front cross member 10F linked between the front end portions of sub side members 10L, 10R; and a sub rear cross member 10RE which links between rear end portions of sub side member 10R and 10L and extended in the vehicular width direction. It is noted that power train 2 includes engine 4 and transmission 6 arranged in series with an output axle of engine 4 and at least three mount portions (as will be described below) support power train 2 on the frame of the vehicle body in such a manner that the output axle of the engine is intersected to a center line of the vehicular longitudinal direction as viewed from the top of the vehicle.

Mount members (mount portions) to support power train 2 are as follows: that is to say, an engine front side mount MT1 is disposed on a vehicular front side with respect to engine 4, an engine rear side mount MT2 is disposed on a vehicular rear side with respect to engine 4, and a transmission side mount MT3 is disposed on an outer end of transmission 6. As shown in FIG. 1, a vertical plane including a principal axis of inertia TR is interposed between two mounts MT1 and MT2 disposed on front and rear sides of engine 4. It is noted that principal axis of inertia TR is an axis such that, when a rigid body is rotated about a certain axis, a moment such as to change a direction of the rotating axis is not generated as viewed from a coordinate system which rotates together with the rigid body and is natural (or inherent) to the power train. In addition, this principal axis of inertia TR is resided with a descending gradient as the vehicular position is directed from the vehicular right side toward the vehicular left side, as shown in FIG. 2. As shown in FIG. 2, mounts MT1 through MT3 are arranged such that an inertia principal axis direction distance L1 from weight center G to a straight line connecting between engine front side mount MT1 and engine rear side mount MT2 is shorter than an inertia principal axis direction distance L2 from weight center G to transmission side mount MT3.

It is known that a rotational inertia excitation force of a three-cylinder engine excites the vibration of the power train in the pitch direction. In order to improve a floor vibration during an engine idling due to the vibration of the power train in the pitch direction, it is necessary to set the natural frequency in the pitch direction to a low frequency region.

The natural frequency of the power train in the pitch direction has a relationship such that as the distance from each engine mount to the weight center of the power train is increased or a rigidity of engine mount is increased, the natural frequency thereof is increased. In addition, the rigidity of each engine mount cannot be reduced more than a value determined from a load of the power train and a power train static deflection regulation value.

In the previously proposed power train supporting apparatus described in the BACKGROUND OF THE INVENTION, the power train is supported at the proximities of the engine outer end in the vicinity to the principal axis of inertia and transmission outer ends in the vicinity to the principal axis of inertia. The distance from the weight center of the power train to each engine mount is large (long) and the load of the power train is applied to all engine mounts. Hence, in the structure of the previously proposed power train supporting apparatus, it is difficult to reduce the rigidity of the engine mount and the distance from the weight center of the power train to each engine mount both determining the natural frequency in the pitch direction of the power train. It is disadvantageous to set the natural frequency of the power train in the pitch direction to the low frequency region. Hence, the floor vibration during the engine idling excited according to the vibration of the power train in the pitch direction cannot be reduced.

However, in this embodiment, engine front and rear side mounts and transmission side mount MT1 through MT3 are arranged as shown in FIGS. 1 and 2. Hence, for each of engine front and rear side mounts MT1 and MT2, the distance from the weight center of the power train can be shortened. For the transmission mount MT3, the power train load to be supported is reduced so that a mount rigidity can be reduced. Thus, the rigidity of each engine mount and the distance from the weight center of the power train to the engine mount, both determining the natural frequency of the power train in the pitch direction, can be reduced. It is advantageous over the previously proposed power train supporting apparatus to set the natural frequency of the power train in the pitch direction to the low frequency region. Consequently, the floor vibration during the engine idling excited according to the vibration in the pitch direction of the power train can be improved.

Figure 3:
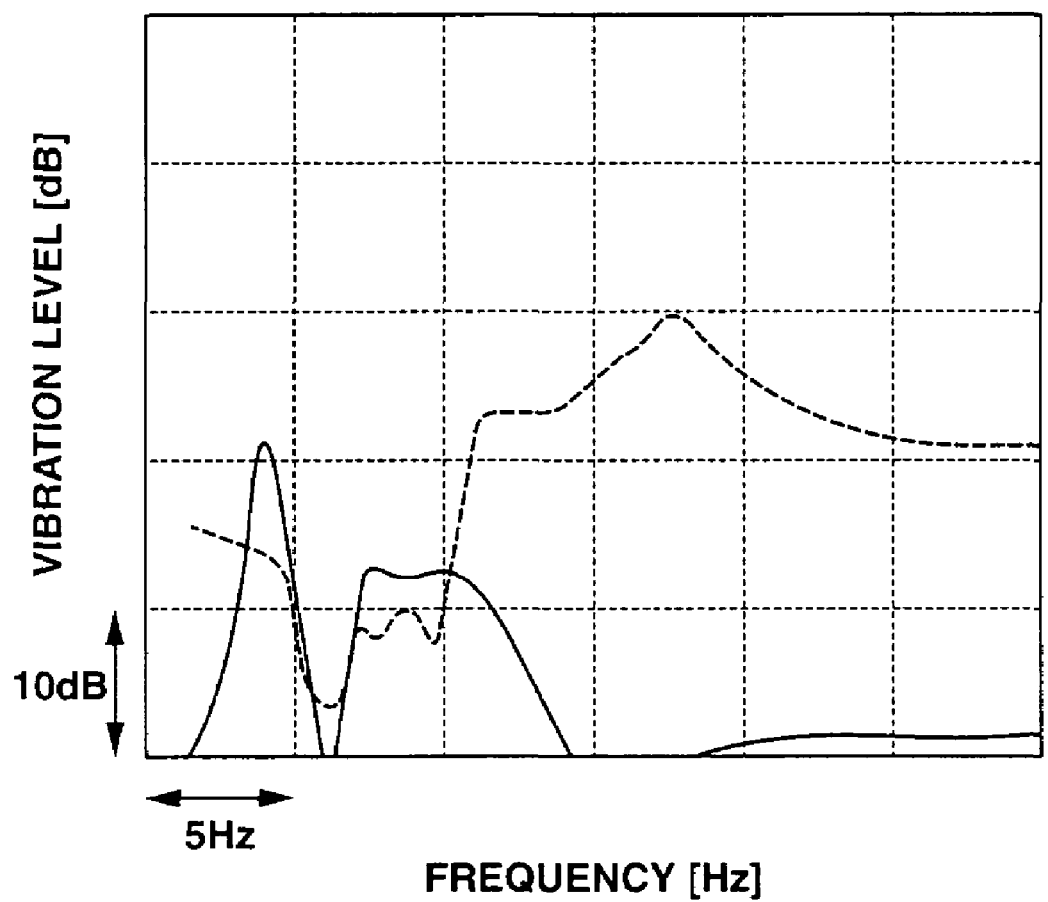
FIG. 3 is a characteristic graph representing an effect achieved by the power train supporting apparatus in the first embodiment shown in FIGS. 1 and 2.

FIG. 3 shows results of investigating the floor vibration during the idling in the vehicle in which the previously proposed power train supporting apparatus is mounted and in the vehicle in which the power train supporting apparatus in the first embodiment is mounted. In FIG. 3, a lateral axis denotes an excitation frequency and a longitudinal axis denotes an acceleration level of the floor vibration. In FIG. 3, the idling floor vibrations are compared between the previously proposed power train supporting apparatus and the power train supporting apparatus in this embodiment. In FIG. 3, a solid line denotes the case of the vehicle in which the power train supporting apparatus in the first embodiment is mounted and a dot line denotes the case of the vehicle in which the previously proposed power train supporting apparatus is mounted.

As appreciated from FIG. 3, in the vehicle in which the power train supporting apparatus is mounted, the floor vibration during the engine idling is reduced as compared with the vehicle in which the previously proposed power train supporting apparatus is mounted. As described above, in the first embodiment, the weight center of the power train constituted by engine 4 and transmission 6 is taken into consideration and the power train is supported with the distance in the direction of the principal axis of inertia from the weight center of the power train to the straight line connecting engine front side and rear side mounts shorter than the distance from the weight center of the power train to transmission side mount. Hence, the natural frequency of the power train in the pitch direction becomes easy to be reduced in the low frequency region and the floor vibration during the engine idling excited due to the vibration of the power train in the pitch direction according to the rotational inertia excitation force of engine 4 can be improved.

Figure 4:
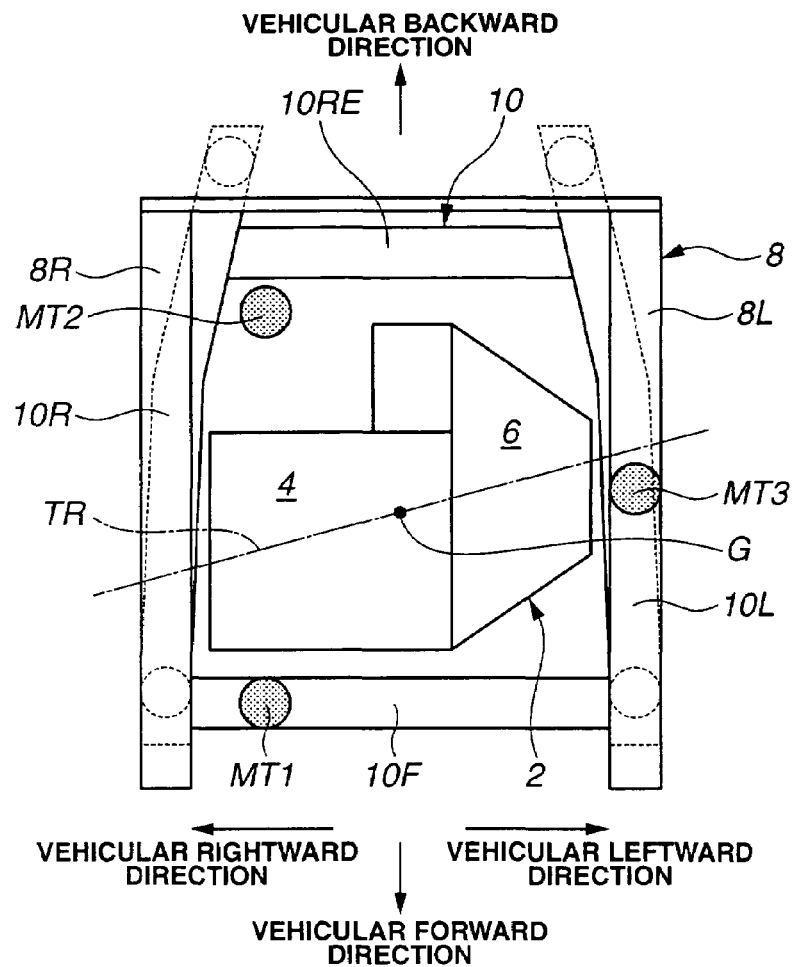
FIG. 4 is a schematic top view of the power train supporting apparatus for the automotive vehicle in a second preferred embodiment according to the present invention.
Figure 5:
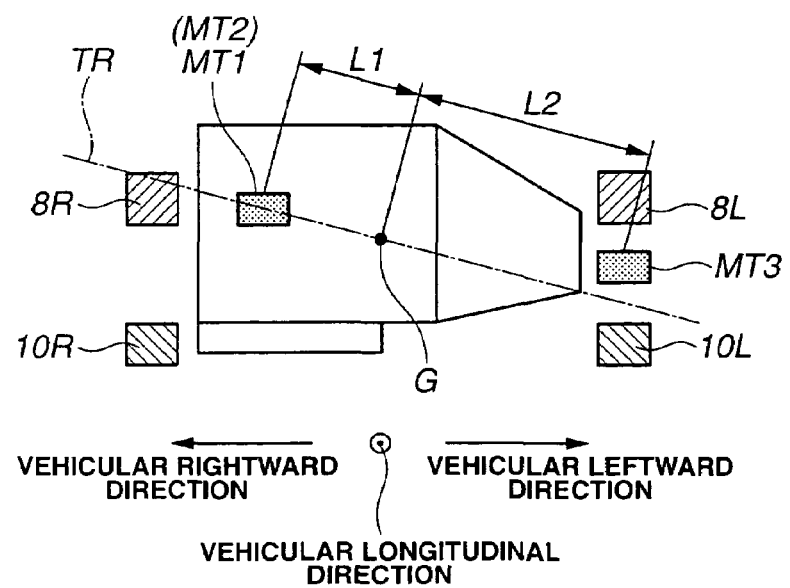
FIG. 5 is a schematic front view of the power train supporting apparatus for the automotive vehicle in the second embodiment shown in FIG. 4.

Next, a second preferred embodiment of the power train supporting apparatus according to the present invention will be described below. FIG. 4 shows a schematic top view of the power train supporting apparatus in a second preferred embodiment according to the present invention. FIG. 5 shows a schematic elevation (front view) of the power train supporting apparatus in the second embodiment according to the present invention. As shown in FIG. 5, engine front and rear side mounts MT1 and MT2 are mounted with principal axis of inertia TR of the power train made (approximately) coincident with engine front and rear side mounts MT1 and MT2 (in other words, principal axis of inertia TR of the power train is intersected with a line connecting between engine front and rear side mounts MT1 and MT2).

The principal axis TR of the power train is ordinarily slanted with respect to an input axis of an engine roll direction due to a combustion excitation force of the engine. Therefore, as viewed from the front view of the vehicle shown in FIG. 2, in the first embodiment of the power train supporting apparatus in which the engine front and rear side mounts and transmission side mount are arranged so as to be substantially made coincident with the input axis of the engine roll direction, in addition to the roll direction vibration is excited due to a torque variation according to the engine combustion excitation force, the vibrations in other directions are excited. Since a plurality of excited vibrations are easy to be coupled, the floor vibration during the engine idling becomes worsened. However, in this embodiment as shown in FIGS. 4 and 5, the positions of engine front and rear side mounts MT1, MT2 and transmission side mount MT3 are arranged so as to be substantially coincident with principle axis TR of inertia as viewed from the front side of the vehicle. Hence, the vibrations excited due to the torque variation according to the engine combustion excitation force can be concentrated to the vibrations around principal axis TR of inertia of the power train. In addition, the plurality of excited vibrations become difficult to be coupled. Consequently, the floor vibration during the engine idling can be improved.

Figure 6:
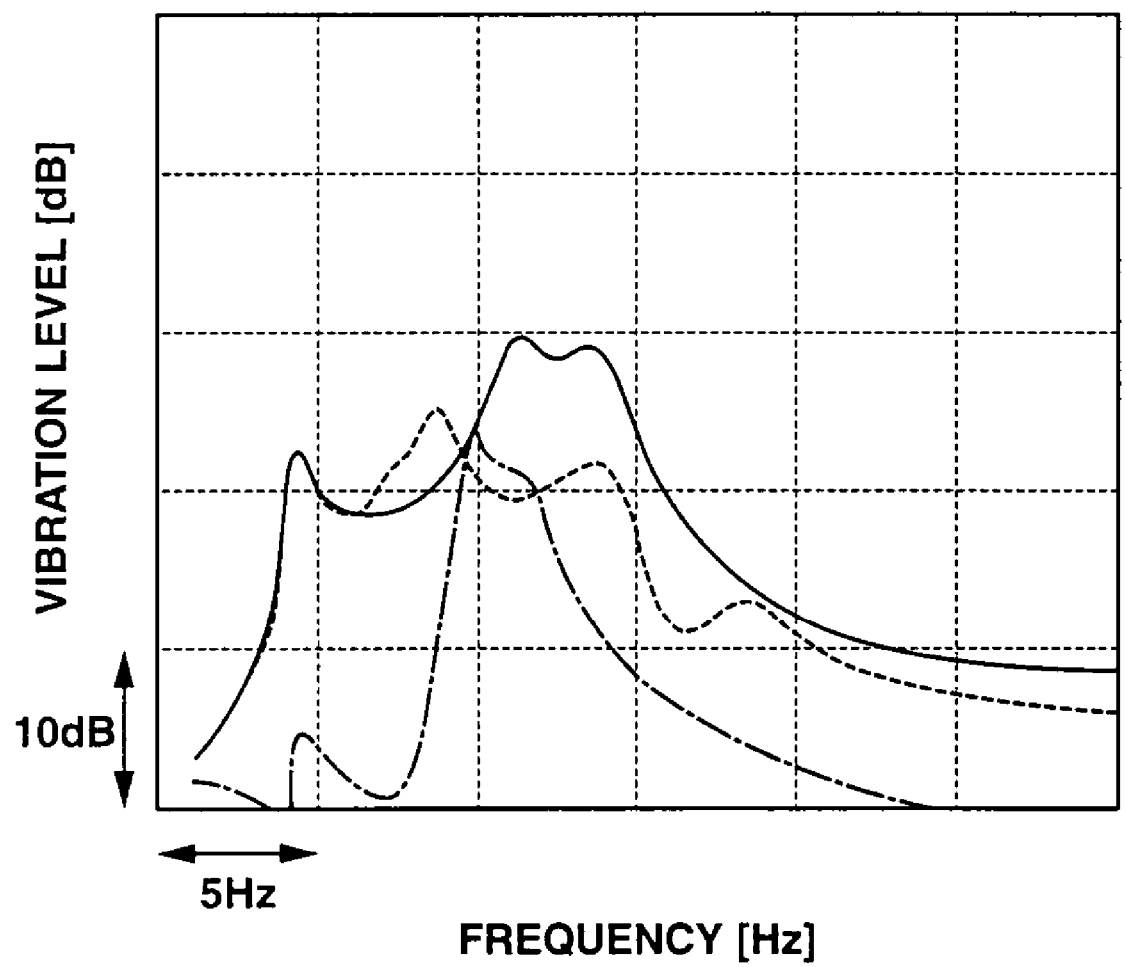
FIG. 6 is a characteristic graph representing the effects achieved by the power train supporting apparatus in the second and a third preferred embodiments.
Figure 9:
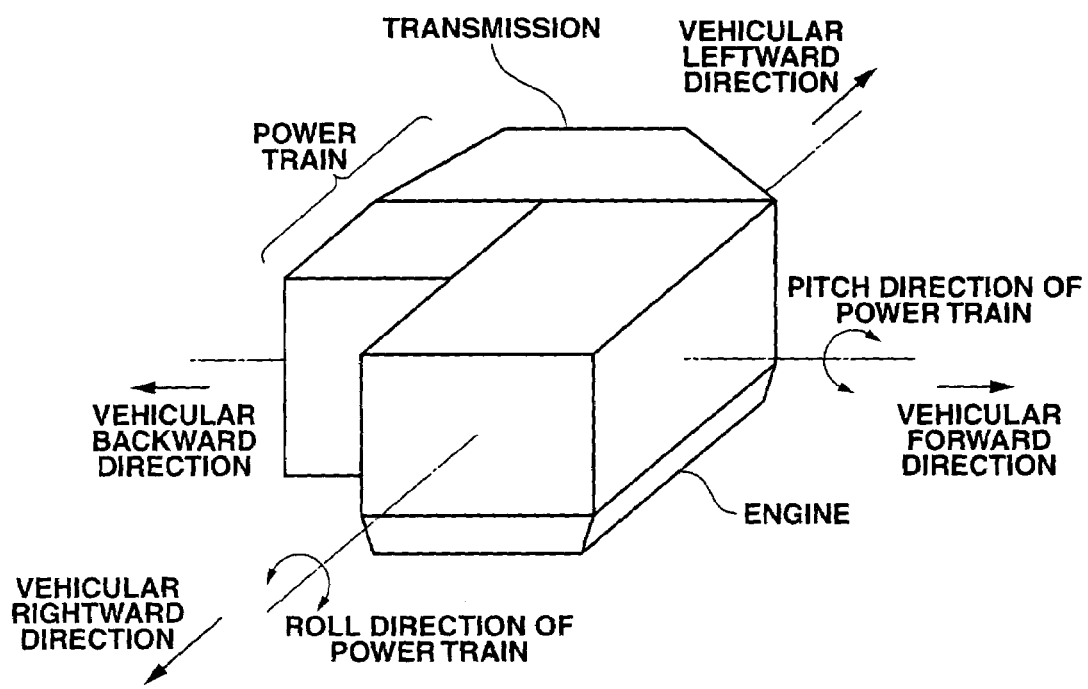
FIG. 9 is an explanatory view for explaining a definition of a pitch direction of a power train.

FIG. 6 shows the result of a comparison of the floor vibration during the engine idling between the vehicles in which power train supporting apparatus in the first embodiment is mounted and in which the power train supporting apparatus in the second embodiment is mounted. A lateral axis of FIG. 6 denotes an excitation frequency and a longitudinal axis thereof denotes the acceleration level of the floor vibration. A solid line in FIG. 6 denotes the floor vibration of the vehicle in which the power train supporting apparatus in the first embodiment is mounted. A dot line in FIG. 6 denotes the floor vibration of the vehicle in which the power supporting apparatus in the second embodiment is mounted. As appreciated from the result of FIG. 6, the vehicle in which the power train supporting apparatus in the second embodiment is mounted furthermore reduced the floor vibration during the engine idling as compared with the vehicle in which the power train supporting apparatus in the first embodiment is mounted.

As described above, in the second embodiment of the power train supporting apparatus, the weight center of the power train including the engine and the transmission is considered, the distance in the direction of the principal axis of inertia from the weight center of the power train to the straight line connecting between the engine front and rear side mounts is arranged to be shorter than the distance from the weight center to the transmission mount, and, as viewed from the front side of the vehicle, engine front and rear side mounts MT1 and MT2 are arranged to be coincident with principal axis of inertia TR of the power train. Hence, the vibration in the roll direction of the engine excited due to the torque variation according to the engine combustion excitation force can be made difficult to be coupled to the other vibrations. The floor vibration during the idling can furthermore be improved. It is noted that, in the second embodiment, as viewed from the front view of the vehicle, the engine front and rear side mounts are arranged to be coincident with principal axis TR of inertia of the power train. However, the present invention is not limited to this. The engine front and rear side mounts may substantially be coincident with the principal axis of the inertia. In other words, as viewed from the front side of the vehicle, a straight line connecting between engine front and rear side mounts MT1 and MT2 may be intersected with principal axis TR of inertia of power train 2.

Next, a third preferred embodiment of the power train supporting apparatus will be described below. In the third embodiment, engine front and rear side mounts MT1 and MT2 are arranged in such a way that the straight line connecting between engine front and rear side mounts MT1 and MT2 is placed in the vicinity to weight center G of the power train. FIG. 7 shows a schematic plan (top) view of the power train supporting apparatus in the third preferred embodiment according to the present invention. FIG. 8 shows a schematic elevation (front) view of the power train supporting apparatus in the third embodiment. As shown in FIGS. 7 and 8, the straight line connecting between engine front side mount MT1 and engine rear side mount MT2 is positioned in the vicinity to weight center G of power train 2. In this arrangement, the distances from a rotation center of the roll direction vibration of the power train to engine front side mount MT1 and to engine rear side mount MT2 are substantially equal to each other. Thus, forces inputted from engine front side mount MT1 and engine rear side mount MT2 to a vehicle body due to the vibration in the roll direction of the power train are substantially equal to each other but their phases are opposite to each other. Thus, the input from engine front side mount MT1 is canceled from the input from engine rear side mount MT2. The floor vibration during the engine idling can be improved.

In the third embodiment, as far as the rigidity of each engine mount determining the natural frequency in the pitch direction of the power train and the distance from the weight center of the power train to each engine mount are concerned with respect to the first embodiment, the distance of the engine side mounts from the weight center of the power train can furthermore be shortened and the load of the power train which transmission side mount MT3 supports can furthermore be reduced. Thus, it becomes possible to set the natural (vibration) frequency in the pitch direction of the power train can be set toward the lower frequency region than the case of the first embodiment. Then, the floor vibration during the engine idling excited by means of the pitch direction vibration of the power train can furthermore be improved. A dot-and-dash line shown in FIG. 6 denotes that of the vehicle in which the power train supporting apparatus in the third embodiment is mounted. As shown in FIG. 6, it will be appreciated that, in the vehicle in which the power train supporting apparatus in the third embodiment is mounted, the floor vibration during the engine idling can furthermore be reduced as compared with the first embodiment denoted in the solid line and the second embodiment denoted in the dot line can furthermore be reduced.

As described above, in the third embodiment, engine front and rear side mounts MT1 and MT2 are arranged in such a way that the straight line connecting between the engine front and rear side mounts is positioned in the vicinity to weight center G of the power train. Hence, the forces transmitted from engine front side mount MT1 and engine rear side mount MT2 to the vehicle are substantially equal to each other and their phases are opposite to each other. Thus, the cancellation between both forces can furthermore improve the floor vibration during the engine idling.

In addition, since, in each embodiment, an engine mount bracket connecting between the engine mounts and the sub frame can be reduced, the rigidity of the bracket can be improved so that a noise during a vehicular acceleration can be improved and its cost can be reduced.

The entire contents of a Japanese Patent Application No. 2004-087061 (filed in Japan on Mar. 24, 2004) are herein incorporated by reference. The scope of the invention is defined with reference to the following claims.

What is claimed is:

1. A power train supporting apparatus for an automotive vehicle, comprising:
   a power train including an engine and a transmission arranged in series with an output axle of the engine, said power train having a weight center; and
   three mount portions that support the power train on a frame of a vehicle body such that the output axle of the engine intersects a center line of a vehicular longitudinal direction as viewed from a top of the vehicle,
   wherein the three mount portions comprise engine front and rear side mounts arranged, respectively, on a vehicular front side and a vehicular rear side with respect to the engine and a transmission side mount arranged in the vicinity of the transmissions, wherein the engine front and rear side mounts are located on one side of the weight center of the power train while the transmission side mount is located on the other side of the weight center as seen from the front side of the vehicle, and the three mount portions being arranged such that distances from the weight center of the power train along a principal axis of inertia to respective lines running through each of the engine front and rear side mounts and intersecting perpendicularly to the principal axis of inertia are shorter than a distance from the weight center of the power train to a line running through the transmission side mount and intersecting perpendicularly to the principal axis of inertia.

2. A power train supporting apparatus for an automotive vehicle as claimed in claim 1, wherein the mount portions are arranged on the vehicle body such that a distance in a direction of the principal axis of inertia from the weight center of the power train to a straight line connecting both of the engine front and rear side mounts is shorter than the distance in the direction of the principal axis of inertia from the weight center of the power train to the line running through the transmission side mount and intersecting perpendicularly to the principal axis of inertia.

3. A power train supporting apparatus for an automotive vehicle as claimed in claim 2, wherein the mount portions are arranged on the vehicle body such that the transmission side mount is arranged in the vicinity of the principal axis of inertia passing through the weight center of the power train and in the vicinity of the transmission and the engine front and rear side mounts are arranged to be coincident with the principal axis of inertia as viewed from the front side of the vehicle.

4. A power train supporting apparatus for an automotive vehicle as claimed in claim 2, wherein the mount portions are arranged on the vehicle body such that the transmission side mount is arranged in the vicinity of the principal axis of inertia passing through the weight center of the power train and in the vicinity of the transmission and the engine front and rear side mounts are arranged to be approximately coincident with the principal axis of inertia as viewed from the front side of the vehicle.

5. A power train supporting apparatus for an automotive vehicle as claimed in claim 2, wherein the engine front and rear side mounts are arranged on the vehicle body such that at least the engine front and rear side mounts are substantially coincident with the principal axis of inertia as viewed from the front side of the vehicle.

6. A power train supporting apparatus for an automotive vehicle as claimed in claim 2, wherein the engine front and rear side mounts are arranged on the vehicle body such that the straight line connecting the engine front and rear side mounts intersects the principal axis of inertia as viewed from the front side of the vehicle.

7. A power train supporting apparatus for an automotive vehicle as claimed in claim 1, wherein the mount portions are arranged on the vehicle body such that a straight line connecting both of the engine front and rear side mounts is positioned in the vicinity of the weight center of the power train as viewed from the front side of the vehicle.

8. A power train supporting apparatus for an automotive vehicle as claimed in claim 1, wherein the mount portions are arranged on the vehicle body such that distances from a rotational center of a vibration in a roll direction of the power train to the engine front side mount and to the engine rear side mount are substantially equal to each other.

9. A power train supporting method for an automotive vehicle, the automotive vehicle having a power train including an engine and a transmission arranged in series with an output axle of the engine, wherein the power train has a weight center the method comprising:
   providing three mount portions that support the power train on a frame of a vehicle body such that the output axle of the engine intersects a center line of a vehicular longitudinal direction as viewed from a top of the vehicle, the three mount portions comprising engine front and rear side mounts arranged, respectively, on a vehicular front side and a vehicular rear side with respect to the engine and a transmission side mount arranged in the vicinity of the transmission; and
   arranging the three mount portions on the vehicle body such that the engine front and rear side mounts are located on one side of the weight center of the power train while the transmission side mount is located on the other side of the weight center as seen from the front side of the vehicle, and such that distances from the weight center of the power train along a principal axis of inertia to respective lines running through a center of each of the engine front and rear side mounts and intersecting perpendicularly to the principal axis of inertia are shorter than a distance from the weight center of the power train to a line running through the transmission side mount and intersecting perpendicularly to the principal axis of inertia.

10. A power train supporting apparatus for an automotive vehicle as claimed in claim 1, wherein the principal axis of inertia has a descending gradient along a vehicle width direction of the vehicle body.

11. A power train supporting apparatus for an automotive vehicle as claimed in claim 1, wherein the mount portions that support the power train on the frame consist essentially of said three mount portions.

12. A power train supporting apparatus for an automotive vehicle, comprising:
- a power train including an engine and a transmission arranged in series with an output axle of the engine; and
- three mount portions that support the power train on a frame of a vehicle body such that the output axle of the engine intersects a center line of a vehicular longitudinal direction as viewed from a top of the vehicle,
- wherein only the three mount portions are used to support the power train on the frame of the vehicle body,
- wherein the three mount portions comprise engine front and rear side mounts arranged, respectively, on a vehicular front side and a vehicular rear side with respect to the engine and a transmission side mount arranged in vicinity of the transmission,
- wherein the three mount portions are arranged such that distances from a weight center of the power train to each of the engine front and rear side mounts are shorter than a distance from the weight center of the power train to the transmission side mount.

* * * * *